Feb. 4, 1936.  F. L. SESSIONS  2,029,594
APPARATUS FOR ELECTRIC WELDING
Filed July 30, 1930  3 Sheets-Sheet 1

INVENTOR:
Frank L. Sessions

Patented Feb. 4, 1936

2,029,594

UNITED STATES PATENT OFFICE 2,029,594

APPARATUS FOR ELECTRIC WELDING

Frank L. Sessions, Lakewood, Ohio

Application July 30, 1930, Serial No. 471,760

17 Claims. (Cl. 219—6)

This invention relates to a method of and apparatus for welding (preferably progressively) the seam in metallic articles such as tubing, sheets, strip, etc. I do not limit my invention to progressive welding as it will be understood that my invention may be used for stationary resistance welding.

The attached drawings show this apparatus applied to the welding of an open longitudinal seam in tubing which may be formed from flat strips or sheets.

Among the objects of my invention are:

The provision of means for and a method of causing a welding current to be generated and supplied to an electrode without the use of relatively moving parts involving current collecting devices in the circuit carrying the necessarily very high amperage welding current.

The provision of an alternating current generator having a field rotor which rotates at relatively high speed and an armature stator rotatably mounted which rotates at the relatively low speed of rotation of the electrodes which contact with and carry welding current to the work being welded as the work moves forward.

The provision of electric welding apparatus in which a motor-generator unit generates welding current, the motor stator and the generator stator being fixedly connected together and rotatably mounted on the shaft on which the motor and generator rotors are fixedly mounted, so that the torque tending to rotate the generator stator opposes and nearly balances the torque tending to rotate the motor stator. By this construction only a comparatively small additional force need be applied to definitely control or prevent the rotation of the stator units except as they may be rotated by the frictional engagement of the electrodes with the moving work.

The provision of braking means to prevent the rotation of the generator stator except at times and at speeds desired.

The provision of a compact, self-contained motor-generator unit for generating an alternating current of the voltage and frequency required for welding without the use of a step-down transformer such as is commonly used at present in apparatus of this type.

The provision of a generator having its terminals fixedly connected to welding electrodes so as to eliminate the use of brushes and collecting rings for the large amperage currents used in electrical resistance welding.

These and other objects which will be apparent from the following description, are accomplished by the use of my invention.

Referring to the drawings:

Fig. 4 is a partial plan view taken from the plane indicated by line 4—4 in Fig. 2 showing the direct connections to the electrodes from the terminals of one armature conductor.

Fig. 5 is a partial plan view taken from the plane indicated by line 5—5 in Fig. 2 showing the cross-over connections to the electrodes of the terminals of an alternate armature conductor.

Figure 1:
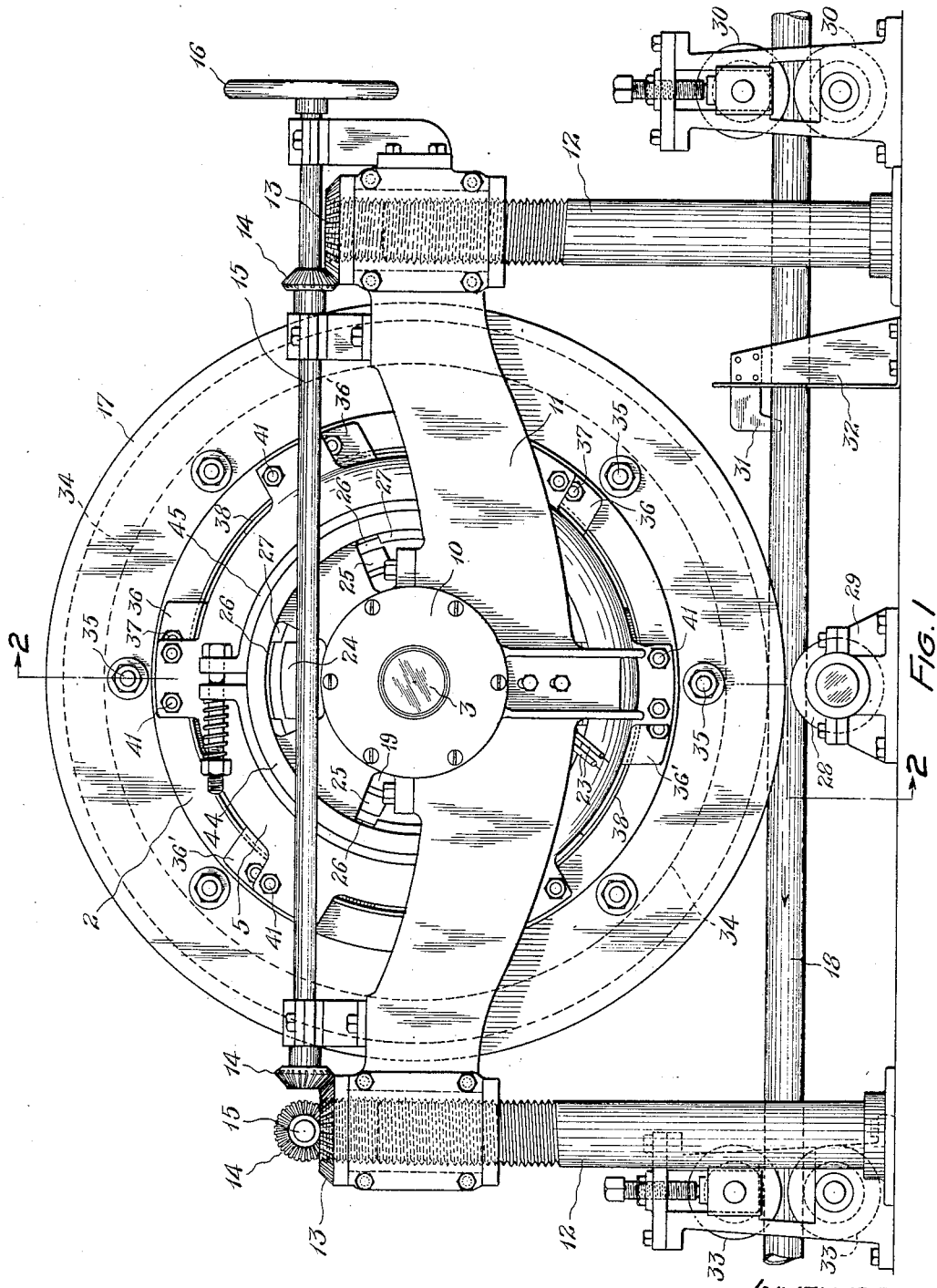
Fig. 1 is a side elevation of my improved welding apparatus showing a tube being welded.
Figure 2:
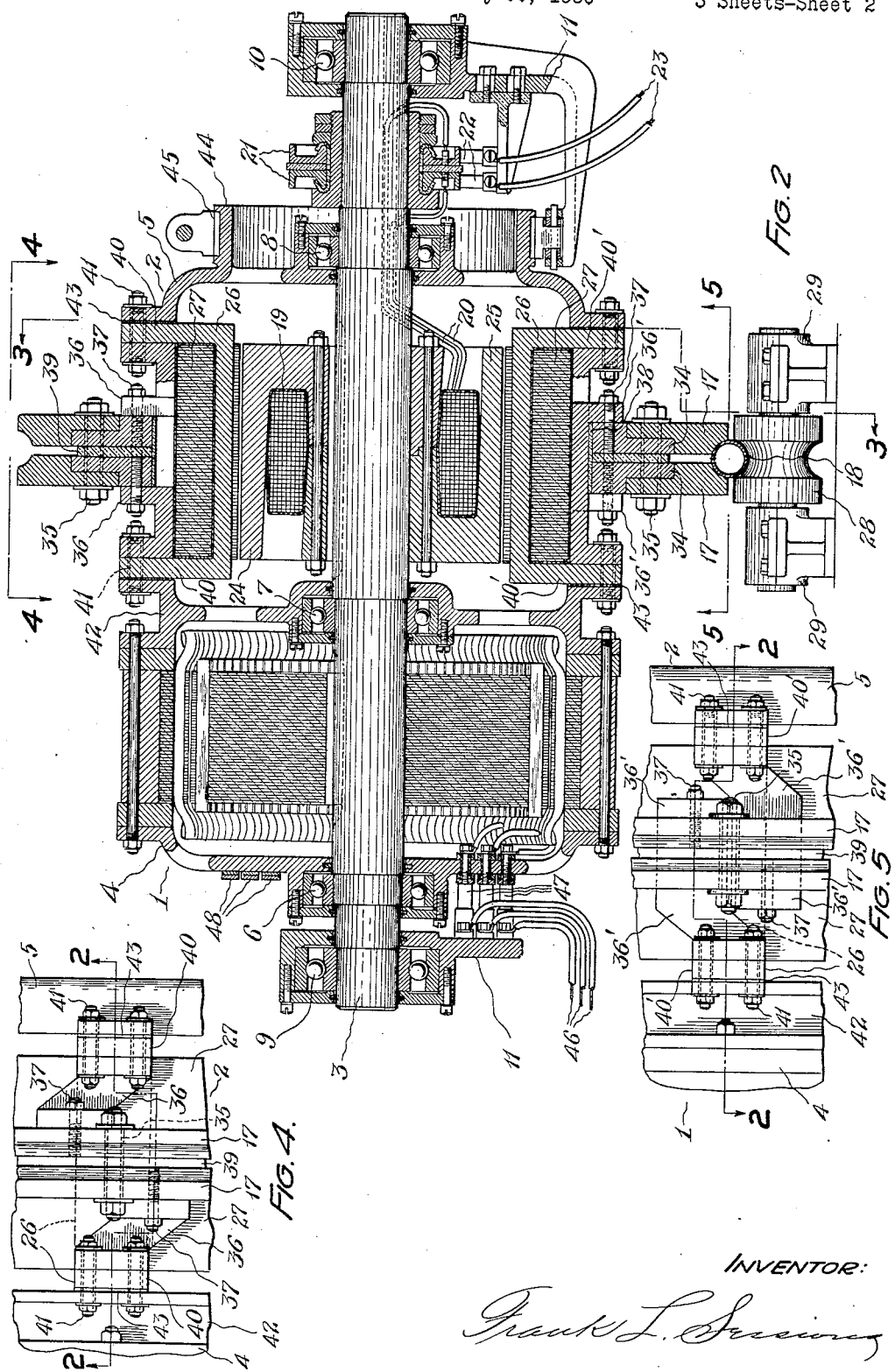
Fig. 2 is a vertical longitudinal section taken in the planes indicated by lines 2—2 in Figs. 1, 4 and 5.
Figure 3:
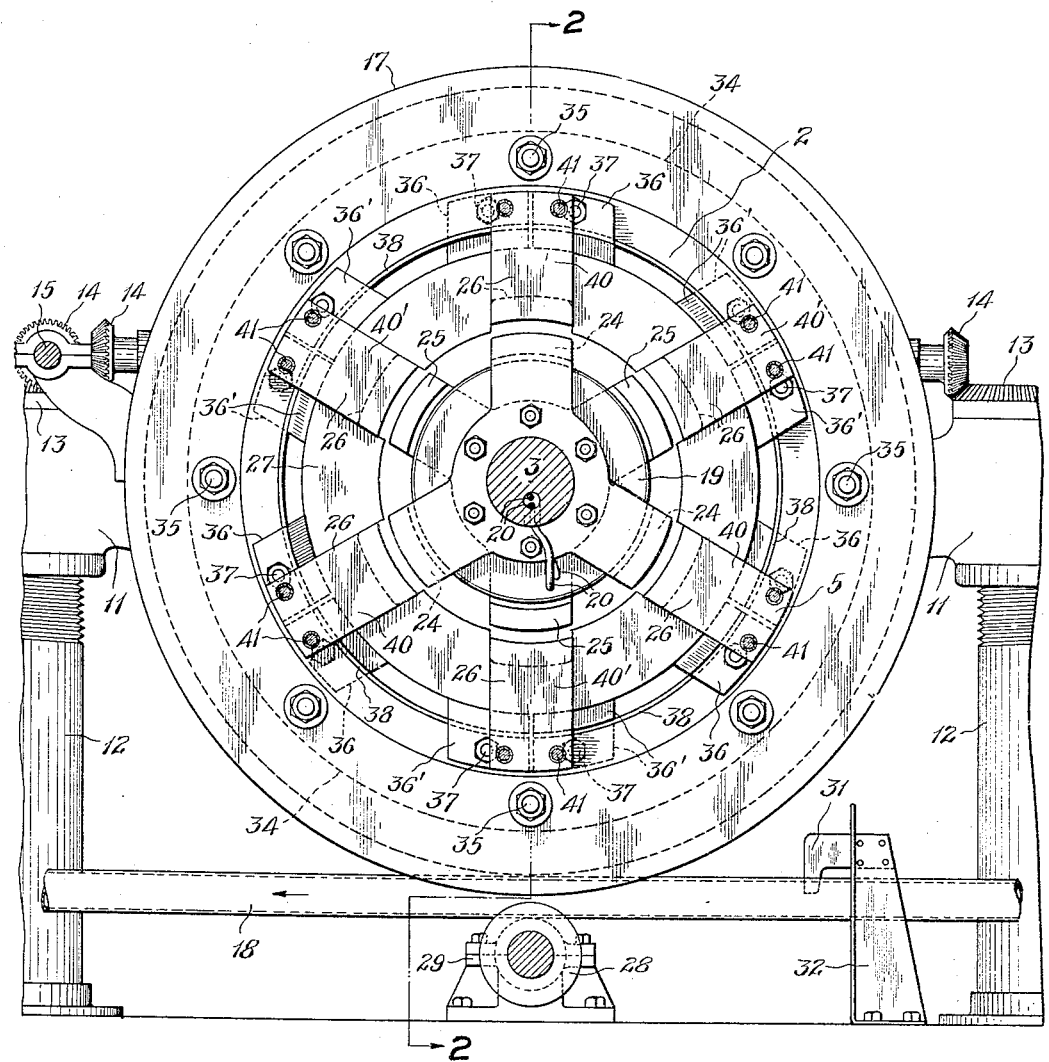
Fig. 3 is a vertical cross section taken in the plane indicated by line 3—3 in Fig. 2.

The motor-generator unit, shown in longitudinal section in Fig. 2, consists of a motor 1 and an alternating current generator 2. The rotors of this motor and generator are mounted on the same shaft 3. The motor stator 4 is fixedly connected to the generator stator 5, and the combined stators are rotatably supported on bearings 6, 7, and 8 which in turn are supported on shaft 3.

The shaft 3 is journaled in bearings 9 and 10, and thus the entire motor-generator unit is supported by these bearings 9 and 10. These main bearings are mounted in suitable supporting housings 11. The housings or bearing supports 11 are mounted on four vertical posts or columns 12 which are threaded at their upper ends to engage with the threaded bores of bevel gears 13. Meshing with these bevel gears 13 are a series of bevel pinions 14 mounted on shafts 15. Mounted on one of the shafts 15 is a handwheel 16 whereby the turning of the handwheel 16 will raise or lower the entire motor-generator unit. The vertical adjustment is necessary in order to properly locate the electrodes 17 with respect to the tube or work to be welded, such as is shown at 18, and to obtain the required pressure between the electrodes 17 and the tube 18. The electrodes 17 are connected to the stator units.

The motor 1 is shown as a three phase squirrel cage induction motor, but it will be understood that any suitable type of motor may be used. Power is supplied to the motor through the wires 46, brushes 47, and slip rings 48.

The generator 2 has a rotating field mounted on shaft 3. The exciting coil 19 is connected to a suitable source of direct current through wires 20, slip rings 21, brushes 22 and lead-in wires 23. The pole pieces 24 are of one polarity and the alternate pole pieces 25 are of the opposite polarity and extend in the opposite direction to pole pieces 24. The generator shown has six pole pieces. Armature conductors 26 and the armature core 27 are mounted in the stator frame 5. The armature conductors 26 are all connected in parallel to the electrode 17, and have a sufficient area of cross section to carry the heavy welding current.

The electrodes 17 are shaped to contact accurately with the tubing being welded. The tube 18 is supported by the pressure roll 28, which is mounted on a shaft supported by bearing blocks 29. The pressure roll 28 is located approximately in the vertical plane passing through the center of the electrodes 17 and shaft 3. The grooves in the pressure roll and the electrodes together make up the welding throat through which the tube passes and which confines the tube to exert the necessary welding pressure between the surfaces which are to be welded together. The open seam tube is fed through the welding throat by the feed rolls 30 or other suitable means. The unwelded seam is held in position by the seam guiding blade 31 which is mounted on the bracket 32 so that the tube enters the welding throat with the seam located approximately in the center of the space between the two electrodes. The take-off rolls 33 assist in feeding the tube through the welding throat and discharge the tube from the machine after the rear end has passed out of the feed rolls 30. The rolls 30 may be the last set of rolls for forming the flat strip into a round open-seam tube in a well known manner, or open-seam tubing formed on a separate machine may be fed through the apparatus shown, to be welded, in which case the rolls 30 would be power driven and would serve to propel the tube through the welding throat. In addition to the take-off rolls 33, as shown, it is common practice to use additional sets of rolls after the welding operation for straightening and sizing the tubing, as will be understood.

The tube is fed through the machine at a constant speed suitable for welding. The speed may be changed to suit the varying conditions of welding but preferably should be constant at the desired speed. The movement of the tube through the welding throat formed by the electrodes and the pressure roll, causes the electrodes and pressure roll to rotate at a speed such that their peripheral speed is approximately the same as the lineal speed of the tube.

The electrodes 17 consist of a pair of metal rings formed of copper, copper alloy or other suitable material, which are bolted to the terminal rings 34, which are also made of copper or other good conducting material. The bolts 35 which fasten the electrodes to the terminal rings are insulated with suitable insulating bushings and washers. The electrode rings 17 are made removable in this manner so that they may be replaced when worn or changed for different sizes of tubing.

The terminal rings 34 are fastened to conductor bars 36 and 36' by means of studs 37, these rings 34 being insulated from the bars 36' by means of the insulation 38, and from each other by the disc of insulation 39. The armature conductors 26 are U-shaped as clearly shown in Fig. 2, and their terminals 40 and 40' are connected to the terminal rings 34 by the conductor bars 36, and cross-over conductor bars 36', respectively, so that terminals of like polarity are connected to the same electrode 17 at all times. The conductor bars 36 and 36' are fastened to the terminals 40 and 40' of the armature conductors 26 by means of insulated bolts 41. These bolts also serve to make a rigid connection between the armature conductors 26 and the stator frame members 5 and 42. The insulating bushings and washers on bolts 41, together with insulation 43, serve to insulate the electrical conducting members of the armature from the stator frame. The frame 42 serves as a common member for both the generator and the motor.

The stator members of the motor-generator unit comprise the field of the motor, the armature of the generator, the electrodes and the frames 4, 5, and 42, which are rotatably mounted preferably on shaft 3. These members form a fixed rigid construction which is rotated slowly by the passage of the tube through the welding throat at a speed such that the peripheral speed of the electrodes substantially equals the lineal speed of the tubing. The use of the word "stator" in this specification is therefore a relative term, the stator being not an absolutely stationary member but being relatively stationary with respect to the rotating armature of the motor and the rotating field of the generator.

When the generator is supplying current for welding and there is a load on the motor, the torque on the motor stator is in a direction opposed to the torque on the generator stator. For this reason, I prefer to connect the two stators so that there can be no relative motion between them. By doing this the motor torque and generator torque substantially counteract each other, and the resultant torque (the excess of the torque of the motor over that of the generator) tending to rotate the stator units is reduced to a minimum. The motor torque being larger than the generator torque, there will be a resultant torque tending to rotate the stator units in the direction of the motor torque. The electrical connections to the motor may be made in such a way as to cause the rotors to revolve in either direction, but I prefer to connect the motor so that the rotor will revolve in a direction opposite to the direction of rotation of the electrodes when the tube is passing through the welding throat. This will cause the torque in the motor stator and the resultant torque tending to rotate the combined motor and generator stators to be in such a direction as to tend to rotate the electrodes in the same direction that they are turned by the movement of the tube through the welding throat. The resultant torque will thus assist the tube in turning the electrodes. It will be understood that the motor stator need not be rotatably supported and fixedly connected to the generator stator if sufficient braking action be present to allow the fixedly connected generator stator and electrodes to rotate only at the speeds desired.

In some cases the friction between the electrodes and the tube will be sufficient to prevent any slipping of the electrodes on the tube and will permit the electrodes and stators to rotate only at the speed corresponding to the speed of the tube through the welding throat. For example, if the electrode groove has a circumference of about nine feet, and the tube is being welded at 63 feet per minute, the speed of the electrodes and stator units is 7 R. P. M. With a six pole generator having its rotor driven at 1200 R. P. M., the E. M. F. developed will have a frequency of 60 cycles per second minus $$\frac{7 \times 6}{120} = 0.35$$

cycles per second lost by the rotation of the stator. This loss in frequency is negligible.

I provide a brake drum 44 connected to the stator frame and a suitable brake shoe or brake band 45 to assist in preventing rotation of the electrodes and stators except at the speed caused by the movement of the tube. This brake may also be used to prevent rotation of the stators when the electrodes are not in contact with the tube and the motor is running idle. When short length tubes are being welded one after another with a small space between them, the brake may be adjusted so as to allow the electrodes to rotate when they are not in contact with the tubing at approximately or just slightly less than the speed at which they are rotated by the tubing. This latter action is desirable because it prevents slipping of the electrodes on the tube which may occur if they are stationary at the time the moving tube engages them. The advancing end of a tube also has a tendency to cut into the electrodes when they are stationary. If they are rotating, this tendency is greatly decreased and the life of the electrodes is lengthened.

The direct current excitation for the field of the generator flows through the wires 23, as previously explained. The exciting current may be controlled and regulated in any well known manner, such as by the use of a rheostat in this circuit, or by a rheostat in the field of the exciting generator, or by a combination of the two. In this way the voltage induced in the armature conductors may be varied through the range required for different welding conditions, for different welding speeds and for different thicknesses of metal. By varying the voltage, the current flowing in the armature circuit of the generator and across the seam being welded will be varied as will be understood. Since the welding heat is proportional to the square of the current, the welding heat may be controlled by the control of the exciting current. Likewise, the welding current is turned on or off by means of any suitable switch to make or break the circuit of the generator field exciting current which flows through the wires 23.

Matters such as the voltage across the electrodes and the power required for welding different sizes and thicknesses of tubing at different speeds; the width of the gap or space between the electrodes; the circumference of the welding throat with respect to the circumference of the unwelded tube blank; the adjustment of the pressure of the electrodes on the tube; means for forming the open seam tubing; means for removing the burr or upset formed at the weld; means for sizing and straightening the welded tubing; mechanisms for propelling the tubing through the welding throat such as means for driving the feed rolls and take-off rolls shown in these drawings; and other details involved in the forming, welding and finishing operation in producing electric resistance welded tubing are well known to those skilled in this art and need not be described here.

In this apparatus the large amperage welding current is induced directly in and flows through a very short electric circuit directly to the electrodes. No collecting means such as brushes, mercury contacts or bearings are required for conducting the heavy welding current between rotating and stationary parts of a circuit and only fixed electrical connections are required in the welding current circuit. The only collecting rings and brushes required in the apparatus shown in the drawings are those for conducting current to the field winding of the motor and to the direct current field coil of the generator. These may be of any well known construction and have a long life, give very little trouble and do not require the skilled adjustment and attention that are necessary with collecting devices for the heavy welding current.

The generator may be designed to generate considerably higher frequencies of alternating current than 60 cycles, if desired, by increasing the speed of the rotor, or by increasing the number of poles in the rotating field with a corresponding adjustment of the number and spacing of the armature conductors. In many cases the use of high frequencies is desirable for welding. This construction is very adaptable to the use of these higher frequencies because of the short and direct circuit through which the welding current flows to reach the tubing.

I do not limit myself to the specific apparatus shown in the drawings and described in this specification, as it will be evident to those skilled in the art that modifications may be made without departing from the scope of my invention.

I claim:

1. In apparatus for electric resistance welding of tubing, an electric circuit for the welding current comprising armature conductors in which said welding current is generated, and an electrode contacting with the tube being welded, said electrode and armature conductors being fixedly, electrically connected to each other.

2. An alternating current generator for the progressive electric resistance welding of a seam in metal having a rotating field and a relatively non-rotating armature, said armature being rotatably mounted, means restraining the rotation of said armature except at a relatively low speed, said speed of rotation of said armature being governed by the speed of progression of the metal being welded.

3. In apparatus for progressive electric resistance seam welding, an electrode adapted to contact with the work to be welded and a generator armature, said electrode and said armature being rotatably mounted and fixedly connected to rotate together.

4. In apparatus for the progressive electric resistance welding of a seam in metal, a generator, an electrode ring surrounding said generator and having a common axis with said generator, said electrode ring being fixedly connected to the armature conductors of said generator and having a contact surface adapted to contact adjacent to the seam with the metal being welded.

5. In an electric resistance welding machine, the combination of an electrode adapted to contact with and carry welding current to the work to be welded, means for progressively moving said work, said electrode being disposed to make rolling contact with said moving work, and a generator having a rotating field and relatively stationary rotatably mounted armature stator, said armature stator being mounted to rotate with said electrode and having fixed electrical connections to said electrode.

6. In apparatus for progressive electric resistance welding, an alternating current generator and a rotatable electrode fixedly electrically connected to said generator and disposed to contact with the work being welded and an armature stator of said generator having fixed mechanical connections to said electrode, said armature stator being mounted to rotate as a unit with said electrode.

7. In apparatus for electric resistance tube welding, the combination of a circular electrode contacting with the tube, pressure roll means acting with said electrode to form a welding throat, means for producing relative longitudinal motion between said tube and said welding throat, and a generator for generating welding current, said generator having its armature mounted for rotation with said electrode and fixedly electrically and mechanically connected to said electrode.

8. In apparatus for the progressive electric resistance welding of a seam in metal, an alternating current generator having a stator comprising the armature, armature conductors in said armature, a pair of electrodes adapted to contact with the metal to be welded upon the respective opposite sides of the seam, and fixed electrical connections between the armature conductors and said electrodes.

9. An electric resistance welding machine comprising an alternating current generator having a rotor field and a stator armature, a pair of circular electrodes carried by said stator and fixedly connected to the respective terminals of the stator armature winding, said electrodes being disposed to contact with the metal constituting the work upon the respectively opposite sides of the seam to be welded, a support for said armature whereby it may rotate with said electrodes, and means for rotating said rotor.

10. In apparatus for progressive electrical resistance welding, a generator, a work support, a roller electrode adapted to contact with the work on said work support, an armature stator for said generator, said armature stator being mounted for rotation as a unit with said electrode, fixed connections between said electrode and said armature stator, and braking means acting on said armature stator and electrode unit.

11. In apparatus for progressive electrical resistance welding, a generator having a mechanically rotated field rotor and a rotatably mounted armature stator, a roller electrode, only fixed electrical connections between said armature stator and said electrode, pressure roll means forming a welding throat with said electrode, and means for feeding the work through said welding throat.

12. In apparatus for the progressive electrical resistance welding of a seam in metal, a generator having a field rotor and a rotatably-mounted, relatively non-rotating armature stator, a work support, a pair of electrodes carried by said stator and fixedly connected to said stator, said electrodes being adapted to contact with the work on said work support upon the respectively opposite sides of the seam to be welded, and means for rotating said field rotor.

13. Apparatus for electric resistance seam welding comprising a motor-generator unit having the stator unit of the motor and the stator unit of the generator fixedly connected; means for rotatably supporting said stator units; electrodes carried by said stator units, adapted to contact with the metal constituting the work upon the respectively opposite sides of the seam to be welded; armature conductors in said generator stator; and means for directly electrically connecting said armature conductors to said electrodes without the use of brushes or other relatively moving current collecting devices.

14. In a machine for electrically welding together edges of work disposed on opposite sides of a seam, two circular electrodes insulated from each other, a generator of electric current comprising a stator and a rotor, means securing said electrodes to said stator, means for feeding said work into position wherein said electrodes contact with the work on opposite sides of said seam, means rotatably supporting said stator and electrodes whereby they may rotate as said work is fed into contact with the electrodes, means to rotate said rotor to generate current, means for passing the current thus generated through said electrodes and through said seam, and braking means acting on said stator and said electrodes.

15. In a machine for electrically welding together edges of work disposed on opposite sides of a seam, two circular electrodes insulated from each other, a generator of electric current comprising a stator and a rotor, means securing said electrodes to said stator, means for feeding said work into position wherein said electrodes contact with the work on opposite sides of said seam, means rotatably supporting said stator and electrodes whereby they may rotate as said work is fed into contact with the electrodes, a motor having a stator and a rotor, means connecting together said stators, means connecting together said rotors whereby rotation of the rotor of the motor will rotate the rotor of the generator to generate current, means for passing the current thus generated through said electrodes and through said seam, and braking means acting on said stators and electrodes.

16. In apparatus for electric resistance welding, a generator serving as a source of welding current, a rotating electrode, only mechanically fixed conductors between said generator and said rotating electrode, and rotation restraining means for said electrode adapted to function whether or not said electrode is in contact with the work to be welded.

17. In a machine for electrically welding together edges of work disposed on opposite sides of a seam, two circular electrodes insulated from each other, a generator of electric current comprising a stator and a rotor, means securing said electrodes to said stator, means for feeding said work into position wherein said electrodes contact with the work on opposite sides of said seam, means rotatably supporting said stator and electrodes whereby they may rotate as said work is fed into contact with the electrodes, means to rotate said rotor to generate current, the stator of the generator comprising the armature and only fixed electrical connections between said armature and said electrodes.

FRANK L. SESSIONS.